US006732512B2

(12) United States Patent
Pfaff et al.

(10) Patent No.: US 6,732,512 B2
(45) Date of Patent: May 11, 2004

(54) VELOCITY BASED ELECTRONIC CONTROL SYSTEM FOR OPERATING HYDRAULIC EQUIPMENT

(75) Inventors: Joseph L. Pfaff, Wauwatosa, WI (US); Keith A. Tabor, Richfield, WI (US)

(73) Assignee: Husco International, Inc., Waukesha, WI (US)

(*) Notice: Subject to any disclaimer, the term of this patent is extended or adjusted under 35 U.S.C. 154(b) by 0 days.

(21) Appl. No.: 10/254,427

(22) Filed: Sep. 25, 2002

(65) Prior Publication Data

US 2004/0055288 A1 Mar. 25, 2004

(51) Int. Cl.[7] .......................... F16B 13/08; F16D 31/02

(52) U.S. Cl. ............................ 60/428; 60/452; 60/459; 91/364; 91/446; 91/454

(58) Field of Search .......................... 60/459, 494, 368, 60/452, 450, 422, 428; 91/361, 364, 444, 446, 454, 456, 457, 459

(56) References Cited

U.S. PATENT DOCUMENTS 3,954,046 A 5/1976 Stillhard
4,061,155 A 12/1977 Sopha
4,250,794 A 2/1981 Haak et al.
4,437,385 A 3/1984 Kramer et al.
4,768,339 A * 9/1988 Aoyagi et al. ................ 60/428
5,201,177 A 4/1993 Kim
5,249,140 A 9/1993 Kessler
5,490,384 A 2/1996 Lunzman
5,666,806 A 9/1997 Dietz
5,680,760 A * 10/1997 Lunzman ..................... 60/452
5,701,793 A 12/1997 Gardner et al.
5,878,647 A 3/1999 Wilke et al.
5,947,140 A 9/1999 Aardema et al.
5,960,695 A * 10/1999 Aardema et al. ............. 91/454
6,282,891 B1 9/2001 Rockwood
6,467,264 B1 * 10/2002 Stephenson et al. .......... 60/368

OTHER PUBLICATIONS

Arne Jansson, et al., "Separate Controls of Meter–in and Meter–out Orifices in Mobile Hyraulic Systems," SAE Technical Papers Series, Sep. 1999, pp. 1–7, SAE International, Warrendale, PA.

* cited by examiner

*Primary Examiner*—Thomas E. Lazo
(74) *Attorney, Agent, or Firm*—George E. Haas; Quarles & Brady LLP

(57) ABSTRACT

A control system for operating a hydraulic system includes a user input device which generates an input signal indicating desired movement of a hydraulic actuator. A mapping routine converts the input signal into a velocity command indicating desired actuator velocity. A valve opening routine transforms the velocity command into a flow coefficient which characterizes fluid flow through the valve assembly and from the flow coefficient produces a set of control signals designating levels of electric current to apply to valves within the valve assembly. A pressure controller regulates pressure in the supply line in response to the velocity command. When the hydraulic system has a plurality of functions, the control system adjusts each velocity command to equitably apportion fluid to each function when the aggregate flow being demanded by the functions exceeds the total flow available from a source.

25 Claims, 1 Drawing Sheet

VELOCITY BASED ELECTRONIC CONTROL SYSTEM FOR OPERATING HYDRAULIC EQUIPMENT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to hydraulic systems for operating machinery, and in particular to electronic control systems for operating electrohydraulic valves to control the flow of fluid to and from hydraulic actuators.

2. Description of the Related Art

A wide variety of machines have moveable members which are operated by an hydraulic actuator, such as a cylinder and piston arrangement or hydraulic motor, that is driven by the flow of fluid controlled by a hydraulic valve. Traditionally the hydraulic valve was manually operated by the machine operator. There is a present trend away from manually operated hydraulic valves toward electrical controls and the use of solenoid operated valves. This type of control simplifies the hydraulic plumbing as the control valves do not have to be located near an operator station, but can be located adjacent the actuator being controlled. This change in technology also facilitates computerized control of the machine functions.

Proportional solenoid operated spool valves are well known for controlling the flow of hydraulic fluid. That type of valve employs an electromagnetic coil which moves an armature connected to the spool, the position of which determines the amount of fluid flow through the valve. The amount that the valve opens is directly related to the magnitude of electric current applied to the electromagnetic coil, thereby enabling proportional control of the hydraulic fluid flow. Either the armature or the spool is spring loaded to close the valve when electric current is removed from the solenoid coil. Alternatively a second electromagnetic coil and armature is provided to move the spool in the opposite direction.

When an operator desires to move a member on the machine, a joystick is operated to produce an electrical signal indicative of the direction and desired rate at which the corresponding hydraulic actuator is to move. The faster the actuator is desired to operate, the farther the joystick is moved from its neutral position. A control circuit receives a joystick signal and responds by producing an electric current of a given magnitude which opens the associated valve to achieve the proper movement of the actuator.

The control of an entire machine, such as an agricultural tractor or construction apparatus is complicated by the need to control multiple functions simultaneously. For example, control of a backhoe often requires simultaneous operation of the separate hydraulic actuators for the boom, arm, bucket, and swing. In some cases, the aggregate amount of hydraulic fluid flow being demanded by the simultaneously operating functions exceeds the maximum flow that the pump is capable of producing. At such times, it is desirable that the control system allocate the available hydraulic fluid among those functions in an equitable manner, so that one function does not consume a disproportionate amount of the available hydraulic fluid flow.

SUMMARY OF THE INVENTION

A typical hydraulic system has a supply line that carries pressurized fluid from a source such as a pump, a return line which carries fluid back to a tank, and at least one hydraulic actuator coupled by a separate valve assembly to the supply line and the return line. A control system operates the valve assemblies in response to an operator input to move each hydraulic actuator as desired by the operator.

The control system includes a user input device operable by the machine user to generate an input signal indicating desired movement of the actuator. A mapping routine converts the input signal into a velocity command designating a desired velocity for the actuator. That velocity command indicates the direction and rate of motion. A valve opening routine converts the velocity command into a set of valve flow coefficients for the valve assembly and, from the set of valve flow coefficients, a set of control signals is produced which designates levels of electric current to apply to valves within the valve assembly. A plurality of valve drivers applies electric current to valves within the valve assembly in response to the set of control signals.

A pressure controller also may be provided to regulate pressure in the supply line in response to the velocity command, thereby ensuring that a suitable pressure is available to power the actuator.

In the preferred embodiment of the invention, a selector is provided to choose a metering mode in which the hydraulic function is to operate. For example, the metering mode is selected in response to the velocity command and force acting on the actuator.

When the hydraulic system has a plurality of functions, a flow sharing routine in included to allocate fluid flow from the supply line equitably to each of the plurality of functions. For example, the flow sharing routine varies the velocity command for each function when the aggregate flow being demanded by the plurality of functions exceeds the total flow available from the supply line.

DETAILED DESCRIPTION OF THE INVENTION

Figure 1:
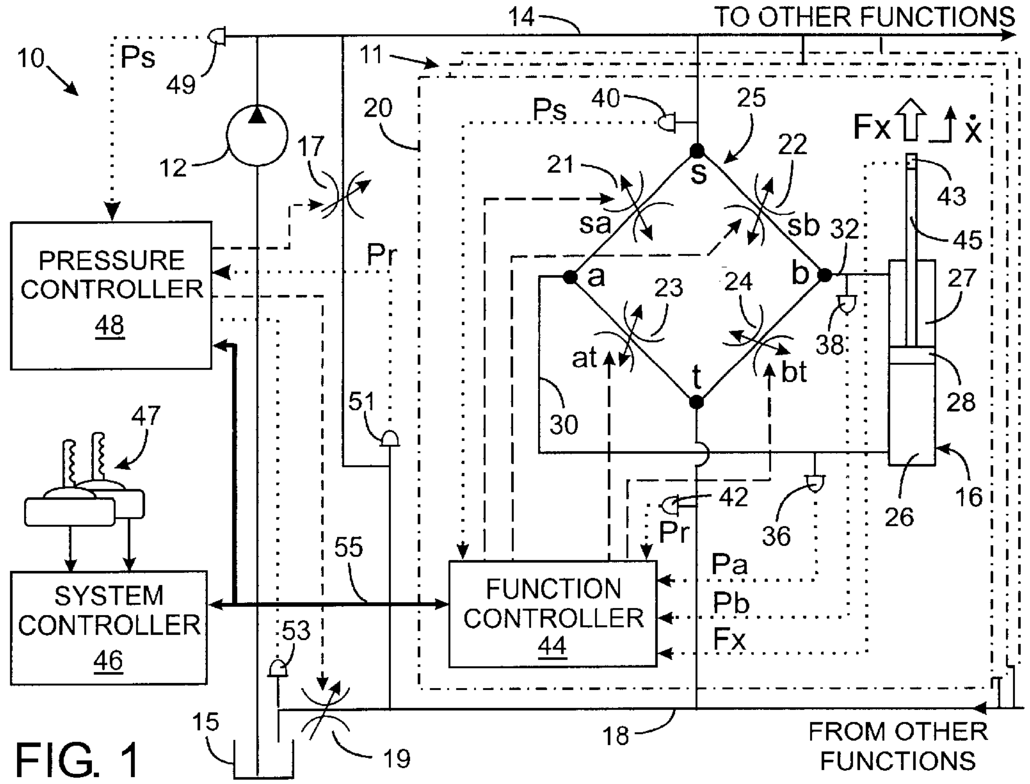
FIG. 1 is a schematic diagram of an exemplary hydraulic system that incorporates the present invention.

With initial reference to FIG. 1, a hydraulic system 10 of a machine has mechanical elements operated by hydraulically driven actuators, such as cylinder 16 or rotational motors. The hydraulic system 10 includes a positive displacement pump 12 that is driven by a motor or engine (not shown) to draw hydraulic fluid from a tank 15 and furnish the hydraulic fluid under pressure to a supply line 14. It should be understood that the novel system configuration described herein also can be implemented on a hydraulic system that employs a variable displacement pump and other types of hydraulic actuators.

The supply line 14 is connected to a tank return line 18 by an unloader valve 17 (such as a proportional pressure relief valve) and the tank return line 18 is connected by tank control valve 19 to the system tank 15.

The supply line 14 and the tank return line 18 are connected to a plurality of hydraulic functions on the machine on which the hydraulic system 10 is located. One of those functions 20 is illustrated in detail and other functions 11 have similar components. The hydraulic system 10 is of a distributed type in that the valves for each function and control circuitry for operating those valves can be located adjacent to the actuator for that function. For example, those components for controlling movement of the arm with respect to the boom of a backhoe are located at or near the arm cylinder or the junction between the boom and the arm.

In the given function 20, the supply line 14 is connected to node "s" of a valve assembly 25 which has a node "t" that is connected to the tank return line 18. The valve assembly 25 includes a node "a" that is connected by a first hydraulic conduit 30 to the head chamber 26 of the cylinder 16, and has another node "b" that is coupled by a second conduit 32 to a port of the rod chamber 27 of cylinder 16. Four electrohydraulic proportional valves 21, 22, 23, and 24 control the flow of hydraulic fluid between the nodes of the valve assembly 25 and thus control fluid flow to and from the cylinder 16. The first electrohydraulic proportional valve 21 is connected between nodes s and a, and is designated by the letters "sa". Thus the first electrohydraulic proportional valve 21 controls the flow of fluid between the supply line 14 and the head chamber 26 of the cylinder 16. The second electrohydraulic proportional valve 22, designated by the letters "sb", is connected between nodes "s" and "b" and can control fluid flow between the supply line 14 and the cylinder rod chamber 27. The third electrohydraulic proportional valve 23, designated by the letters "at", is connected between node "a" and node "t" and can control fluid flow between the head chamber 26 and the return line 18. The fourth electrohydraulic proportional valve 24, that is between nodes "b" and "t" and designated by the letters "bt", controls the flow from the rod chamber 27 to the return line 18.

When other types or configurations of hydraulic actuators are being controlled, the valve assembly 25 may comprise less than four electrohydraulic proportional valves. For example to control a single acting cylinder, in which fluid is applied to only one chamber, a pair of valves is sufficient to control flow of fluid from the supply line and to the tank. In another variation of the present invention, the valve assembly 25 could comprise an electrically operated spool valve.

The hydraulic components for the given function 20 also include two pressure sensors 36 and 38 which detect the pressures Pa and Pb within the head and rod chambers 26 and 27, respectively, of cylinder 16. Another pressure sensor 40 measures the pump supply pressure Ps at node "s", while pressure sensor 42 detects the tank return pressure Pr at node "t" of the function 20. Note that supply and return pressure sensors 40 and 42 may not be present on all functions 11. It should be understood that the various pressures measured by these sensors may be slightly different from the actual pressures at these points in the hydraulic system due to line losses between the sensor and those points. However the sensed pressures relate to and are representative of the actual pressures and accommodation can be made in the control methodology for such differences.

The pressure sensors 36, 38, 40 and 42 for the function 20 provide input signals to a function controller 44 which operates the four electrohydraulic proportional valves 21–24. The function controller 44 is a microcomputer based circuit which receives other input signals from a system controller 46, as will be described. A software program executed by the function controller 44 responds to those input signals by producing output signals that selectively open the four electrohydraulic proportional valves 21–24 by specific amounts to properly operate the cylinder 16.

The system controller 46 supervises the overall operation of the hydraulic system 10 exchanging signals with the function controllers 44 and a pressure controller 48. The signals are exchanged among the three controllers 44, 46 and 48 via a communication network 55 using a conventional message protocol. The pressure controller 48 receives signals from a supply line pressure sensor 49 at the outlet of the pump, a return line pressure sensor 51, and a tank pressure sensor 53. In response to those pressure signals and commands from the system controller 46 the pressure controller 48 operates the tank control valve 19 and the unloader valve 17. This controls the pressure in the supply line 14 and in the return line 18. However, if a variable displacement pump is used, the pressure controller 48 controls the pump.

Figure 2:
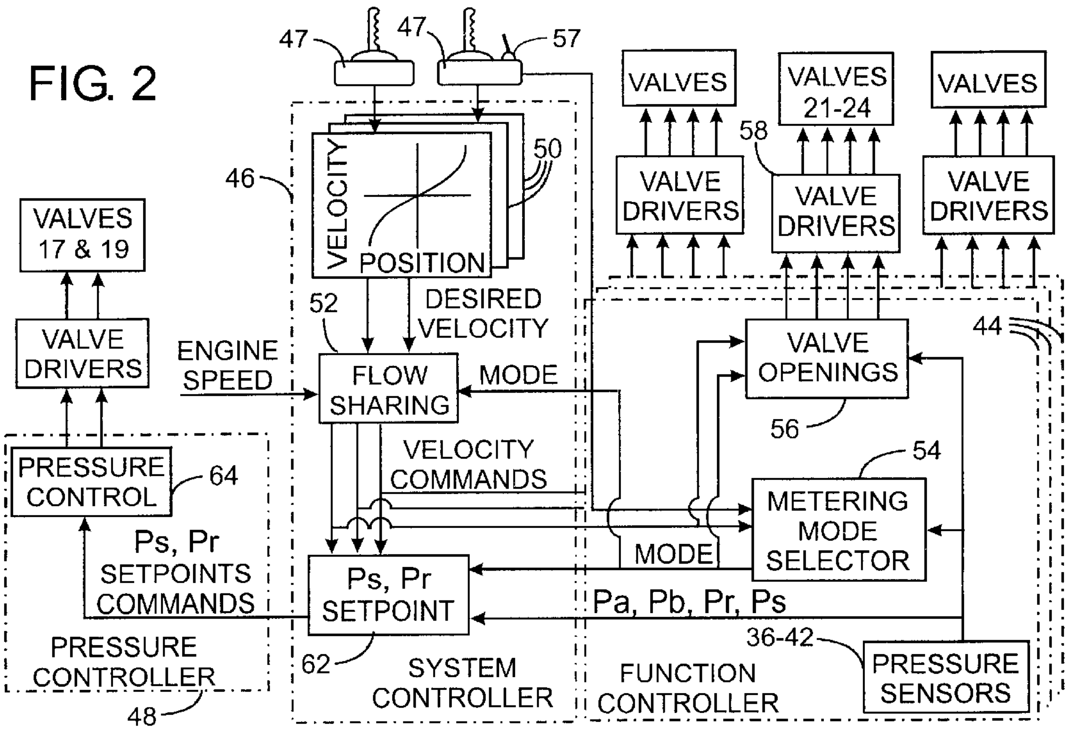
FIG. 2 is a control diagram for the hydraulic system.

With reference to FIG. 2, the control functions for the hydraulic system 10 are distributed among the different controllers 44, 46 and 48. A software program executed by the system controller 46 responds to input signals by producing commands for the function controllers 44. Specifically, the system controller 46 receives signals from several user operated joysticks 47 or similar input devices for the different hydraulic functions. Those input device signals are received by a separate mapping routine 50 for each function which converts the joystick position signal into a signal indicating a desired velocity for the associated hydraulic actuator being controlled. The mapping function can be linear or have other shapes as desired. For example, the first half of the travel range of the joystick from the neutral center position may map to the lower quartile of velocities, thus providing relatively fine control of the actuator at low velocity. In that case, the latter half of the joystick travel maps to the upper 75 percent range of the velocities. The mapping routine may be implemented by an arithmetic expression that is solved by the computer within system controller 46, or the mapping may be accomplished by a look-up table stored in the controller's memory. The output of the mapping routine 50 is a signal indicative of the velocity desired by the system user for the respective function.

In an ideal situation, that desired velocity is used to control the hydraulic valves associated with the particular function. However in many instances, the desired velocity may not be achievable in view of the simultaneous demands placed on the hydraulic system by other functions 11 of the hydraulic system 10. For example, the total quantity of hydraulic fluid flow demanded by all the functions may exceed the available output of the pump 12. In that case, the control system apportions the available flow among the functions demanding hydraulic fluid, and a given function is unable to operate at the full desired velocity. Although that apportionment may not achieve the desired velocity of each function, it does maintain the velocity relationship among the actuators as indicated by the operator.

To determine whether apportionment is required, the desired velocities for all the functions are applied to a flow sharing software routine 52 along with the metering mode for each hydraulic function. From that data, the flow sharing software routine calculates the aggregate flow being demanded by the presently active hydraulic functions. The flow sharing software routine 52 also calculates the amount of flow available in the hydraulic system based on the speed of the pump and the pumps output flow as a function of speed. Then the amount of flow available is compared to the aggregate flow being demanded to derive a percentage of the aggregate demanded flow that can be met by the total available flow. The desired velocity for each function then is multiplied by that percentage to produce a velocity command for the respective function.

Thus when apportionment is necessary, the functions are operated at a fraction of their desired velocities so that the available fluid flow will be allocated in a equitable manner that preserves the velocity relationships among the active functions as intended by the operator.

In order for the flow sharing routine 52 to apportion the available fluid, the metering mode of each function must be known, along with the desired velocity, because that mode determines the demanded amount of fluid and the function's contribution of fluid that can be used by other functions. The metering mode for a particular function is determined by a metering mode selection routine 54 executed by the function controller 44 of the associated hydraulic function. The metering mode for a particular function is determined based on the velocity command for that function and the external force Fx acting on the associated actuator, as indicated by the actuator pressures Pa and Pb or a force sensor 43. Alternatively a manual switch 57 can be used by the machine operator to select the metering mode.

With reference to FIG. 1, the fundamental metering modes in which fluid is supplied from the pump to one of the cylinder chambers 26 or 27 and drained to tank from the other chamber are referred to as powered metering modes, i.e. the "powered extension mode" or the "powered retraction mode" depending the direction that the piston rod moves. Because the piston rod 45 occupies some of the volume of the rod chamber 27, that chamber requires less hydraulic fluid to move the piston 28 a given amount than is required by the head chamber 26. As a consequence, less supply fluid flow is required in the retraction mode than in the extension mode at a given speed.

Hydraulic systems also employ regeneration metering modes in which fluid being drained from one cylinder chamber is fed back through the valve assembly 25 to the other cylinder chamber. In a regeneration metering mode, the fluid can flow between the cylinder chambers through either the supply line node "s" referred to as "high side regeneration", or through the return line node "t" in "low side regeneration". The benefit of a regeneration mode is that the entire volume of fluid required to fill the expanding chamber of the cylinder does not have to be supplied from the pump 12 or return line 18.

To retract the piston rod in a regeneration mode, fluid is forced from the head chamber 26 into the rod chamber 27 of a cylinder. Therefore, a greater volume of fluid is draining from the head chamber than is required in the smaller rod chamber. In the low side regeneration retraction mode, that excess fluid enters the return line 18 from which it continues to flow either to the tank 15 or to other functions 11 operating in a low side regeneration mode that require additional fluid. That excess fluid, in the high side regeneration retraction mode, flows through the supply line 14 to other functions 11 that are drawing fluid from that line or flows through the unloader valve 17 into the return line 18.

Regeneration also can be used to extend the piston rod 45 from the cylinder 16. In this case, an insufficient volume of fluid is exhausting from the smaller rod chamber 27 than is required to fill the head chamber 26. When high side regeneration is used to extend the rod, the additional fluid comes from the pump 12. In the low side regeneration extension mode, the function has to receive additional fluid from the tank return line 18. That additional fluid originates either from another function (i.e. cross-function regeneration), or from the pump 12 through the unloader valve 17. It should be understood that in this mode, the tank control valve 19 is at least partially closed to restrict fluid in the return line 18 from flowing to the tank 15, instead that fluid will be supplied to another function 11.

With reference again to FIG. 2, the velocity command for each function is sent to the associated function controller 44 where it is applied to the metering mode selection routine 54. The routine can be a manual input device which is operable by the machine operator to determine the mode for a given function. Alternatively, the function controller 44 can employ an algorithm in which various system pressures are examined to determine the optimum metering mode for the given function at that particular point in time. Once selected, the metering mode is communicated to the system controller 46 and other routines within the respective function controller 44.

The metering mode, the pressure measurements and the velocity command are used by a valve opening routine 56 to determine how to operate the electrohydraulic proportional valves 21–24 to achieve the commanded velocity of the piston rod 45. In each metering mode, two of the valves in assembly 25 are active, or open. The metering mode defines which pair of valves will be opened. The valve opening routine 56 then utilizes the magnitude of the velocity command and the pressure measurements to determine the amount that each of the selected valves is to be opened.

Specifically the function controller 44 determines an equivalent coefficient, which represents the equivalent fluidic conductance of the hydraulic circuit branch in the selected metering mode to achieve the desired movement of the actuator 16. The equivalent conductance coefficient then is used to calculate individual valve conductance coefficients, which characterize fluid flow through each of the four electrohydraulic proportional valves 21–24 and thus the amount, if any, that each valve is to open. A valve which is closed in the selected metering mode has a valve conductance coefficient of zero. It should be apparent that in place of the equivalent conductance coefficient and the valve conductance coefficients, the inversely related flow restriction coefficients can be used to characterize the fluid flow. Both conductance and restriction coefficients characterize the flow of fluid in a section or component of a hydraulic system 10 and are inversely related parameters. Therefore, the generic terms "equivalent flow coefficient" and "valve flow coefficient" are used herein to cover both conductance and restriction coefficients.

The valve opening routine 56 determines the valve flow coefficients for the valves in the assembly 25 which are used to produce four output signals indicating the degree to which each respective valve is to open. The function controller 44 sends the four output signals to a set of valve drivers 58 which produce electric current levels for operating the electrohydraulic proportional valves 21–24.

The system controller 46 also calculates the pressure in the supply and return lines 14 and 18 necessary in order to meet pressure requirements of the hydraulic functions 11 and 20. For that purpose, the system controller 46 executes a setpoint routine 62 which determines a separate pump supply pressure setpoint for each function of the machine and then selects the setpoint having the greatest magnitude to use as the supply line pressure setpoint Ps. This pressure setpoint is derived based on the equivalent conductance coefficient and the pressures Pa and Pb in the cylinder chambers in the preferred embodiment. Alternatively the actuator force measured directly by the sensor 43 can be used in place of the cylinder chamber pressures. The setpoint routine 62 also determines a return line pressure setpoint Pr in a similar manner.

The two pressure setpoints, Ps and Pr, are sent to and used by a pressure control routine 64 that is executed by the pressure controller 48 to achieve those pressure levels in the supply line 14 and the return line 18. Specifically the pressure control routine 64 causes the pressure controller to operate the unloader valve 17 to build or relieve pressure in the supply line 14. Correspondingly, fluid flow produced by the pump 12 in excess of the amount required (on the supply line 14) by the functions 11 and 20 passes through the unloader valve 17. Similarly by operating the tank control valve 19, the pressure controller 48 maintains the pressure in the tank return line 18 at the level defined by the setpoint Pr. This action allows excessive fluid above that required in the tank return line 18 to flow to the system tank 15. In hydraulic systems that employ a variable displacement pump, the pressure controller 48 governs the operation of that pump. In this case, the tank control valve 19 is operated primarily to ensure that sufficient fluid is available from the tank return line 18 to fed those function which are operating in a low side regeneration mode.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An apparatus for controlling a hydraulic system having a pump which forces fluid from a tank into a supply line connected to a hydraulic function, the hydraulic function including a valve assembly which controls flow of the fluid between the supply line and an actuator and between the actuator and the tank, the apparatus comprising:

a user input device which generates an input signal indicating desired movement of the actuator;

a mapping routine which converts the input signal into a velocity command designating a desired actuator velocity;

a valve opening routine which converts the velocity command into a flow coefficient which characterizes fluid flow through the valve assembly and from the flow coefficient produces a control signal designating electric current to apply to the valve assembly;

a valve driver which applies electric current to the valve assembly in response to the control signal; and a pressure controller which regulates pressure in the supply line in response to the velocity command.

2. The apparatus as recited in claim 1 further comprising a selector that chooses a metering mode in which the hydraulic function is to operate.

3. The apparatus as recited in claim 2 wherein the selector chooses the metering mode in response to the velocity command and force acting on the actuator.

4. The apparatus as recited in claim 2 wherein the selector comprises a manually operable switch.

5. The apparatus as recited in claim 1 wherein the hydraulic system has a plurality of functions connected to the supply line, and further comprising a flow sharing routine which allocates fluid flow from the supply line to each of the plurality of functions.

6. The apparatus as recited in claim 1 wherein the hydraulic system has a plurality of functions connected to the supply line, and further comprising a flow sharing routine which adjusts the velocity command for each function when the aggregate flow being demanded by the plurality of functions exceeds the total flow available from the supply line.

7. The apparatus as recited in claim 1 further comprising a pressure setpoint routine which produces a pressure setpoint that is based on the velocity command and a pressure at the actuator; wherein the pressure controller regulates pressure in the supply line in response to the pressure setpoint.

8. The apparatus as recited in claim 7 wherein the pressure setpoint routine derives the pressure setpoint from the flow coefficient.

9. A control apparatus for operating a hydraulic system having a pump which forces fluid from a tank into a supply line connected to a plurality of hydraulic functions, each hydraulic function including a valve assembly which controls flow of the fluid between the supply line and an actuator and between the actuator and the tank, the control apparatus comprising:

a user input assembly which for each function generates an input signal indicating desired movement of the actuator associated with that function;

a mapping routine which converts each input signal into a velocity command designating a desired velocity for the associated actuator, thereby producing a plurality of velocity commands;

a flow sharing routine which alters the plurality of velocity commands when the aggregate flow being demanded by the plurality of functions exceeds the total flow available from the supply line;

a valve opening routine which converts each velocity command into a set of valve flow coefficients each of which characterizes fluid flow through a valve of the valve assembly, and from the set of valve flow coefficients produces a set of control signals designating levels of electric current to apply to the valve assembly of the respective function; and a plurality of valve drivers which apply electric current to valves within each valve assembly in response to the respective set of control signals.

10. The control apparatus as recited in claim 9 further comprising a selector that chooses a metering mode in which each hydraulic function is to operate.

11. The control apparatus as recited in claim 10 wherein the selector chooses the metering mode in response to the velocity command and force acting on the actuator for the respective hydraulic function.

12. The control apparatus as recited in claim 9 further comprising a pressure controller which regulates pressure in the supply line in response to the plurality of velocity commands.

13. The control apparatus as recited in claim 12 further comprising a pressure setpoint routine that employs each velocity command to calculate an equivalent flow coefficient which characterizes fluid flow through the respective hydraulic function, and the pressure in the supply line is regulated based on at least one of the equivalent flow coefficients.

14. An apparatus for controlling a hydraulic system having a pump which forces fluid from a tank into a supply line connected to a hydraulic function, the hydraulic function including a valve assembly which controls flow of the fluid between the supply line and an actuator and between the actuator and the tank, the apparatus comprising:

a user input device which generates an input signal indicating desired movement of the actuator;

a system controller connected to the user input device and converting the input signal into a velocity command designating a desired velocity for the actuator; and a function controller connected to the system controller and converting the velocity command into a set of valve flow coefficients each of which characterizes fluid flow through a valve of the valve assembly, the function controller using each flow coefficient to produce a separate control signal which designates a magnitude of electric current to apply to a valve within the valve assembly.

15. The apparatus as recited in claim 14 further comprising a plurality of valve drivers which apply electric current to valves within the valve assembly in response to each control signal.

16. The apparatus as recited in claim 14 further comprising a pressure controller connected to the system controller and regulating pressure in the supply line in response to the velocity command.

17. The apparatus as recited in claim 16 the system controller further comprises a pressure setpoint routine which produces a pressure setpoint that is based on the velocity command and an indication of force acting on the actuator; wherein the pressure controller regulates pressure in the supply line in response to the pressure setpoint.

18. The apparatus as recited in claim 14 wherein the function controller comprises a selector that chooses a metering mode in which the hydraulic function is to operate.

19. The apparatus as recited in claim 18 wherein the selector chooses the metering mode in response to the velocity command and force acting on the actuator.

20. The apparatus as recited in claim 14 wherein the hydraulic system has a plurality of functions connected to the supply line; and the system controller further comprises a flow sharing routine which allocates fluid flow from the supply line to each of the plurality of functions.

21. The apparatus as recited in claim 20 wherein the flow sharing routine produces adjustment of the velocity command for each function when the aggregate flow being demanded by the plurality of functions exceeds the total flow available from the supply line.

22. A control apparatus for operating a hydraulic system having a pump which forces fluid from a tank into a supply line connected to a plurality of hydraulic functions, each hydraulic function including a valve assembly which controls flow of the fluid between the supply line and an actuator and between the actuator and the tank, the control apparatus comprising:

a user input assembly which generates an input signal indicating a desired motion to be produced by the hydraulic system;

a mapping routine which converts the input signal into commands designating desired movement for actuators associated with the plurality of the hydraulic functions, thereby producing a plurality of commands;

a flow sharing routine which alters the plurality of commands when the aggregate flow being demanded by the plurality of functions exceeds the total flow available from the supply line;

a valve opening routine which converts each command into a set of valve flow coefficients each of which characterizes fluid flow through a valve of the valve assembly, and from the set of valve flow coefficients produces a set of control signals designating levels of electric current to apply to the valve assembly of the respective function; and a plurality of valve drivers which apply electric current to valves within each valve assembly in response to the respective set of control signals.

23. The control apparatus as recited in claim 22 further comprising a selector that chooses a metering mode in which each hydraulic function is to operate.

24. The control apparatus as recited in claim 23 wherein the selector chooses each metering mode in response to the command and force acting on the actuator for the respective hydraulic function.

25. The control apparatus as recited in claim 22 further comprising a pressure controller which regulates pressure in the supply line in response to the plurality of commands.

* * * * *